US009644776B2

(12) United States Patent
Westmeier et al.

(10) Patent No.: US 9,644,776 B2
(45) Date of Patent: May 9, 2017

(54) PREFABRICATED ELECTRICALLY HEATABLE MEDIA LINE AND METHOD FOR PRODUCING A MEDIA LINE OF THIS KIND

(75) Inventors: Jörg Westmeier, Düsseldorf (DE); Mark Heienbrok, Engelskirchen (DE); Erik Gramckow, St. Augustin (DE); Martin Sachse, Wipperfürth (DE); Tobias Etscheid, Lindlar (DE)

(73) Assignee: VOSS AUTOMOTIVE GMBH, Wipperfürth (DE)

( * ) Notice: Subject to any disclaimer, the term of this patent is extended or adjusted under 35 U.S.C. 154(b) by 432 days.

(21) Appl. No.: 13/885,043

(22) PCT Filed: Nov. 14, 2011

(86) PCT No.: PCT/EP2011/005719
§ 371 (c)(1),
(2), (4) Date: Jul. 18, 2013

(87) PCT Pub. No.: WO2012/065710
PCT Pub. Date: May 24, 2012

(65) Prior Publication Data
US 2013/0294757 A1    Nov. 7, 2013

(30) Foreign Application Priority Data

Nov. 18, 2010  (DE) .......................... 10 2010 051 550

(51) Int. Cl.
*E03B 7/10*         (2006.01)
*F24H 1/10*         (2006.01)
(Continued)

(52) U.S. Cl.
CPC ........... *F16L 53/004* (2013.01); *F16L 11/127* (2013.01); *F16L 53/008* (2013.01);
(Continued)

(58) Field of Classification Search
None
See application file for complete search history.

(56) References Cited

U.S. PATENT DOCUMENTS

| 1,809,714 A | * | 6/1931 | Mathews | ............... F16L 53/008 |
| | | | | 219/522 |
| 2,516,864 A | * | 8/1950 | Gilmore | ................... B29B 13/00 |
| | | | | 138/133 |

(Continued)

FOREIGN PATENT DOCUMENTS

DE   20 2005 004 602 U1    8/2005
DE   10 2005 037 183 B3    5/2007
(Continued)

OTHER PUBLICATIONS

Japanese Office Action dated Sep. 16, 2015 for Application No. JP2013-539159, 8 pages.

*Primary Examiner* — Thor Campbell
(74) *Attorney, Agent, or Firm* — Hudak, Shunk & Farine Co. LPA

(57) ABSTRACT

In a prefabricated electrically heatable media line having at least one pipeline part with an integrated electrically conductive device and having at least one connecting device, in particular a plug, screw or coupling device, the pipeline part and the electrically conductive device extend as far as or close to that end of the connecting device which is averted from the pipeline part or close to, in front of or in a connection contour. In a method for producing a media line, a pipeline part is produced with at least one integrated electrically conductive device and the integrated electrically conductive device is exposed in at least one end region of the pipeline part, permanent electrical contact is made with said integrated electrically conductive part by a contact-making device, and the contact-making device is routed out at the (Continued)

outer face of the pipeline part in order to form a connection to an electrical energy source.

14 Claims, 3 Drawing Sheets

(51) Int. Cl.
*H05B 3/40* (2006.01)
*F16L 53/00* (2006.01)
*F16L 11/127* (2006.01)

(52) U.S. Cl.
CPC ...... *F01N 2610/02* (2013.01); *F01N 2610/10* (2013.01); *F01N 2610/14* (2013.01); *Y10T 29/49002* (2015.01)

(56) References Cited

U.S. PATENT DOCUMENTS

| | | | | |
|---|---|---|---|---|
| 3,163,707 | A * | 12/1964 | Darling | A47L 9/24 128/204.18 |
| 3,378,673 | A * | 4/1968 | Hopper | F16L 53/008 138/149 |
| 3,764,779 | A * | 10/1973 | Kadoya | F16C 1/10 138/33 |
| 4,038,519 | A * | 7/1977 | Foucras | A61M 1/369 138/133 |
| 4,553,023 | A * | 11/1985 | Jameson | F16L 53/008 137/341 |
| 5,713,864 | A * | 2/1998 | Verkaart | A61N 1/02 165/165 |
| 5,791,377 | A * | 8/1998 | LaRochelle | B60S 1/488 138/109 |
| 5,862,303 | A | 1/1999 | Adar et al. | |
| 5,971,251 | A * | 10/1999 | Moore | H01R 4/023 228/112.1 |
| 7,266,293 | B1 * | 9/2007 | Dundas | F16L 11/127 392/465 |
| 7,469,719 | B2 * | 12/2008 | Gray | A61M 16/08 128/203.26 |
| 8,380,056 | B2 * | 2/2013 | Evans | F24H 1/142 392/465 |
| 8,559,800 | B2 * | 10/2013 | Ellis | F16L 53/007 392/468 |
| 2003/0059213 | A1 * | 3/2003 | Mackie | A61M 16/08 392/480 |
| 2007/0036528 | A1 * | 2/2007 | Ferrone | A01K 7/027 392/480 |
| 2008/0012293 | A1 | 1/2008 | Freiberger et al. | |
| 2008/0101781 | A1 | 5/2008 | Muller | |
| 2008/0237210 | A1 * | 10/2008 | MacLean | G05D 23/27536 219/221 |
| 2010/0130072 | A1 * | 5/2010 | Cecil | H01R 4/20 439/730 |
| 2010/0201586 | A1 * | 8/2010 | Michalk | H02G 1/1285 343/741 |
| 2010/0253067 | A1 | 10/2010 | Isenburg et al. | |
| 2010/0263740 | A1 | 10/2010 | Borgmeier et al. | |
| 2011/0006513 | A1 | 1/2011 | Lechner et al. | |
| 2013/0248501 | A1 * | 9/2013 | Anderson | B23K 26/103 219/121.69 |

FOREIGN PATENT DOCUMENTS

| | | |
|---|---|---|
| DE | 10 2006 051 413 A1 | 5/2008 |
| DE | 20 2007 010 502 U1 | 1/2009 |
| EP | 1 793 152 A1 | 6/2007 |
| EP | 1 985 908 A1 | 10/2008 |
| JP | 2007211979 A1 | 8/2007 |
| WO | 2006 097765 A1 | 9/2006 |
| WO | 2009080477 A1 | 9/2006 |
| WO | 2009 080501 A1 | 7/2009 |
| WO | 2010 080890 A1 | 7/2010 |

* cited by examiner

PREFABRICATED ELECTRICALLY HEATABLE MEDIA LINE AND METHOD FOR PRODUCING A MEDIA LINE OF THIS KIND

FIELD OF THE INVENTION

The invention relates to a prefabricated electrically heatable media line with at least one tubing part having an integrated electrically conductive device, and with at least one connection device to establish a fluidic connection, as well as to a method for manufacturing such a media line.

BACKGROUND OF THE INVENTION

Such electrically heatable media lines are known in the art. The electrically heatable device is here used to heat the media line, and the connection device to establish a fluidic connection between the media line and, for example, a generating set. Known from DE 10 2005 037 183 B3 is a heatable fluid line with a pipe, at least one heating resistor as well as at least two electrical lines for the heating resistor, wherein the electrical lines are arranged parallel to the pipe, and the heating resistor is arranged transverse to the longitudinal extension between the two electrical lines. Also provided is a clamp exhibiting an edge that contacts an electrical line. The clamp edge penetrates into the pipe material from outside to a depth where the otherwise covered electrical line is contacted. The electrical line is connected to a power supply via the clamp.

DE 10 2006 051 413 B4 discloses another way of providing an electrically heatable fluid line with electrical connections. The fluid line exhibits an inner cross sectional region that envelops a medium-conveying channel, a heating conductor arrangement and an outer cross sectional region. The heating conductor arrangement is connected with the inner cross sectional region in a thermally conductive manner, and the outer cross sectional region envelops the heating conductor arrangement. Situated between the inner cross sectional region and the outer cross sectional region is an intermediate layer, which separates the heating conductor arrangement from the outer cross sectional region, and is mechanically less stable than the inner cross sectional region and outer cross sectional region. The intermediate layer can be rubbed clean to allow contacting with the heating conductor arrangement. The outer cross sectional region can be severed and removed from the end of the fluid line. The outer cross sectional region is removed from the intermediate layer after severed. The intermediate layer is removed from the inner cross sectional region given its low stability in relation to the inner cross sectional region. As soon as the intermediate layer has been removed, the ends of the heating conductor arrangement are exposed, and can be contacted.

WO 2010/080890 A1 discloses an electrically heated, flexible liquid line with an oblong flexible pipe body, which encompasses an electrical resistance heating device. The latter envelops the liquid flow path. In one configuration variant, heat-generating electrical flow paths are formed by an electrically conductive wire in a pipe body, which wraps around the liquid flow path, so as to intersect two electrical supply lines at numerous locations. In another configuration variant, the heat-generating electrical flow path contains a layer comprised of electrically conductive polymers inside the pipe body, enveloping the liquid flow path. The entire pipe body either consists of electrically conductive polymers, or the polymer layer is arranged between two electrically nonconductive layers. The electrical supply lines are hooked up to an electrical energy source via electrical connections, wherein the electrical connections are arranged at the same end of the pipe body, at opposite ends, or along the pipe body.

DE 20 2005 004 602 U1 discloses a heatable liquid line with electrical lines embedded in the jacket of the liquid line. A plastic hose through which a liquid flows here forms an innermost layer, which is enveloped by a middle layer comprised of an electrically conductive polymer with a positive temperature characteristic for the electrical resistor and electrical lines embedded therein, wherein an outer layer comprised of an insulating material envelops the outside of the line. The middle layer is disclosed as a thermoplastic polymer with electrically conductive particles in the form of a PTC polymer layer, which is extruded onto the innermost layer.

The solutions proposed in prior art for connecting the heating conductors and coupling with connection devices prove to be rather elaborate, and their implementation can generally not be automated. Therefore, manual actions are required, which makes production expensive. Further, prior art does not provide that the connection device also be designed to be heatable, or does so only with considerable connection outlay.

SUMMARY OF THE INVENTION

Therefore, the object of the present invention is to simplify and reduce the number of steps for manufacturing a prefabricated electrically heatable media line, wherein it is also to be easily possible to heat the one fluid connection, in particular with a connection device that permits a generating set.

The object is achieved for a prefabricated electrically heatable media line comprising at least one tubing part having an integrated electrically conductive device and with at least one connection device, wherein by virtue of the fact that the tubing part and electrically conductive device extend as far as or close to the end of the connection device that is averted to the tubing part, or close to, in front of or in a connection contour. For a method for manufacturing a media line, the object is achieved by fabricating a tubing part with at least one integrated electrically conductive device, and, in at least one end region of the tubing part, exposing the integrated conductive device, making electrical contact with the latter by means of a contacting device, and routing the contacting device out on the outside of the tubing part for connection to an electrical energy source. Further embodiments of the invention are defined in the dependent claims.

Proposed as a result is a prefabricated electrically heatable media line or a method for its manufacture, in which a separate heater for the connection device need no longer be provided, since the tubing part provided with the electrically conductive device extends as far as or at least close to the end of the connection device, or close to, in front of or in the connection contour on a generating set, e.g., a generating set plug. This enables complete heatability for the connection device without here having to provide additional heating conductors on the outside of the connection device.

Understood here as an integrated electrically conductive device are heating conductors embedded in the pipe wall, as well as electrical conductors embedded in conductive material provided in the pipe wall. In embedded heating conductors, the heating source for heating the tubing part is the heating conductor, and in electrical conductors embedded in conductive material, the conductive material carrying an electrical current between the electrical conductors then acting as the poles is the heating source. In the latter instance, the electrical conductors are hence PTC conductors, while the heating conductors in the first case are heat conductors.

In order to generate the connection device for establishing a fluidic connection at the end region of the tubing part, a connection contour is generated by primary shaping or a connection contour is attached. The connection device can hence be attached on or to the end region of the tubing part by primary shaping and/or material bonding, in particular through sheathing, gating, casting, laser welding, friction welding, and adhesive bonding. As a result, the contour of the connection device can be designed according to the customer's wishes or in a specifiable standard form, thereby yielding a wide range of variants that is not possible in the known methods for manufacturing media lines. The media line can further be fabricated in any application-dependent lengths without any added outlay. Because no additional heating conductors are needed in particular in the area of the connection device, it is enough to only provide a single heatable component in the form of the tubing part having an embedded electrically conductive device. This can tangibly reduce the material outlay and beyond that the costs of manufacturing the media line as well, since in particular clippings that otherwise arise in conventionally heatable media lines when crimping the tubing part and connection device are no longer encountered. Rather, the tubing part is cut to size to reflect the desired overall length of the media line, and the desired connection contour is placed or secured on the ends of the tubing part or attached thereto in such a way that the electrically conductive device extends in, on or at least in front of the connection contour. As a consequence, not only is the media line between the connection devices heatable in design, so too are the latter.

By also covering in particular the region in which the exposed integrated conductive device of the tubing part contacts the connection device, the connecting region can also be sealed without any problem. The connection elements that advantageously project out of the connection contour created through primary forming or material bonding and are coupled with the integrated conductive device can be hooked up to an electrical energy source by fitting on a connector plug or attaching a connection device, into which in particular a connector plug can be inserted. A corresponding recess is advantageously provided for inserting such a connector plug or connection device in the connection contour. The connector plug can be inserted into such a recess in particular by way of sealing elements, and the connection elements protruding from the connection contour can be correspondingly sealed. As a consequence, at least one connection element advantageously extends from the electrically conductive device as far as the outside of the connection device or contour.

Instead of subjecting the connection device or contour to primary shaping on the end region of the tubing part or coupling it in a material bonding process, such as laser welding, friction welding or some other process that generates a material bond, the latter can also be attached to the end of the tubing part, as long as heating is not provided for the connection device, or intended to take place differently.

The tubing part can be an electrically heatable multilayer plastic pipe. A middle layer of the tubing part can here consist of a plastic material filled with at least one conductive component, in particular a plastic material filled with conductive carbon black, metal powder or carbon nanotubes. The tubing part further advantageously exhibits at least two single-extruded electrical conductors or heating conductors, in particular two to four, preferably two. The conductors or heating conductors can be designed as wires, strands and/or non-insulated conductors. Because an electrically conductive plastic material is provided, the thermal heat is generated inside the pipe material or wall of the tubing part, and not via a heating conductor arranged on the outside of a pipe, as otherwise usually the case in prior art, e.g., in EP 1 985 908 A1. In particular the application of a plastic material filled with conductive components further yields a uniform distribution of heat output over the periphery of the tubing part as well as over its longitudinal extension. The at least two electrical conductors or heating conductors inside the conductive layer serve to homogeneously distribute the heat output over the entire tubing part, wherein, as already mentioned, when electrical conductors are provided, the latter form poles between which current flows through the plastic material filled with conductive components.

The electrical conductors or heating conductors advantageously extend at a steep gradient, in particular a gradient of 20 to 150 mm, coiled around a base pipe or an inner layer of the tubing part, so as to enable or facilitate the forming and bending of the tubing part. The electrical conductors or heating conductors are thus coiled around the base pipe or header, respectively, at a steep gradient, so that, as opposed to the arrangement without such a coiling, it becomes possible to form and bend the tubing part as desired, even with low bending radii, and hence adjust it to the respective installation space in terms of its shape.

The integrated electrically conductive device, in particular the electrical conductors or heating conductors arranged inside the walls of the tubing part, can advantageously be exposed through laser cutting. The respective position of the coiled conductors or heating conductors arranged inside the wall of the tubing part can be ascertained rather well from the outside of the tubing part, since when the gradient is known, this position can be determined based on the conductor or heating conductor ends visible at the end of the tubing part. The tubing part can thus also be inserted into such a laser cutting device without a prescribed alignment, and given the appropriate programming, the position of the interior conductors or heating conductors can be determined, and the laser can be positioned at the desired location, so as to initially expose and then contact the conductors or heating conductors. Therefore, such a process of using laser cutting technology to expose the conductors or heating conductors incorporated through extrusion can be very readily automated. This is not possible in methods of prior art, e.g., those disclosed in DE 10 2006 051 413 B4 or DE 10 2005 037 183 B3, since these require continuous contacting using a clamp with insulated sections, wherein blades cut into the raw material and contact through, or scratching off to remove end layers of such a tubing part. In laser cutting, a surface piece of the material of the tubing part wall is removed in the region of the conductor or heating conductor. This can be done by burning the material with the laser beam, wherein the laser beam essentially hits the outer surface of the tubing part perpendicularly. Or the laser beam blasts the material away from the wall of the tubing part, during which the laser beam tangentially hits the outer surface of the tubing part.

As a consequence, it is possible to automate not just the process of exposing the interior conductors or heating conductors, but also the process of providing the connection contour at the ends, thereby enabling a savings in associated costs.

After the interior integrated conductive devices, in particular taking the form of electrical conductors or heating conductors, have been exposed, the latter are joined with connection elements which, after the end region of the tubing part has been provided with the connection contour, outwardly protrude on their exterior side, so as to there be joined with the connector plug or a connection device, as already mentioned. In particular, the exposed electrically conductive device is contacted with the connection element (s) via soldering, e.g., inductive soldering, or welding, e.g., pulse welding. Other joining processes are basically also possible.

In order to generate an insulation effect for the tubing part, the latter can at least partially be enveloped by an insulating or protective pipe or a sheath, wherein the insulation effect is generated by an insulating air gap between the insulating or protective pipe or the sheath and the tubing part, or the tubing part exhibits an insulating layer, in particular an outer layer having an insulation effect. The connection device or contour can encompass at least one receiving groove for accommodating a protective or insulating pipe enveloping the tubing part or a sheath, e.g., a corrugated pipe. The latter are provided for thermal insulation, and advantageously envelop the tubing part from one connection device to the other. In order to have the ability to provide an especially good connection with the connection contour, it proves advantageous to provide such a receiving groove for engaging into the end of the protective or insulating pipe or the sheath. The latter can be directly molded in while providing the connection contour on the tubing part end region. It is also possible to also integrate or attach at least one sealing element, in particular a two-component gasket. As an alternative, however, separate sealing elements, such as O-rings, can be arranged on the connection device.

The tubing part can exhibit a wall thickness of up to 4 mm, in particular 2 to 4 mm, in particular 1.5 mm or less, for example of 1 mm or less. If neither a protective or insulating pipe nor a sheath is provided, but rather an outer layer of the tubing part simultaneously serves as the insulation device, a good insulation effect can be achieved with a wall thickness of 4 mm or potentially even less. It is further possible to stagger the at least two conductors or heating conductors over the periphery of the tubing part, in particular offset by an angle of 10 to 360°, preferably by an angle 180°. The diameter of the electrical conductors or heating conductors can measure less than 0.5 mm, in particular 0.4 mm. The electrical conductors or heating conductors can be coiled or wound around the tubing part spaced apart from each other, in particular with the windings spaced apart by 20 to 60 mm, preferably 40 mm.

The tubing part can exhibit different layers, which all consist of the same material, wherein at least one middle layer has been modified to exhibit an electrical conductivity. For example, the tubing part can exhibit an inner layer composed of a media-resistant electrically insulating material, in particular polyvinylidene fluoride (PVDF) or a polyamide, such as an aliphatic polyamide, in particular PA12 or PA11. The inner layer can have a thickness of 0.1 to 0.3 mm. Other dimensions are basically also possible, above all if this proves advantageous specific to the application. The inner layer can have situated above it an intermediate layer, which in particular consists of a conductive aliphatic polyamide, such as PA12 or PA11. The conductors or heating conductors are embedded in the intermediate layer, in particular with a diameter of 0.4 mm. For example, the intermediate layer also exhibits the conductive components already mentioned above, such as conductive carbon black, metal powder or carbon nanotubes, etc. The intermediate layer is enveloped by an outer layer, which also can be comprised of PA12, PA11 or another polyamide, in particular aliphatic polyamide. The outer layer is advantageously a non-thermal, non-electrically conductive or insulating layer, but one which can be machined with a laser, wherein the latter can replace the protective or insulating pipe or the sheath in terms of insulation effect. Accordingly, the outer layer can have a thickness in particular of 0.5 mm or more. The intermediate layer and outer layer and/or intermediate layer and inner layer can further have arranged between them a barrier layer, which, in the process of laser machining to expose the electrical conductors or heating conductors, acts as a safeguard to prevent in particular the inner layer from being perforated during laser machining, which would raise the concern of media flowing out from inside the tubing part.

Because the electrically conductive device extends continuously from the distal end of the one end-side connection device to the distal end of the other connection device, the prefabricated electrically heatable media line permits a low power consumption and high level of efficiency, since no other connections are required other than hooking up an electrical power source to the electrically conductive device of the media line. In particular, the high level of efficiency is rooted in the fact that the tubing part is heated over its entire periphery, and thus enables a uniform distribution of heat output over the entire periphery of the tubing part.

BRIEF DESCRIPTION OF THE DRAWINGS

In order to explain the invention in more detail, exemplary embodiments of the latter will be described below based on the drawings. Shown on:

FIG. 3a is a detailed view of the connection device with inserted connection contour or generating set plug.

DETAILED DESCRIPTION OF THE INVENTION

Figure 1:
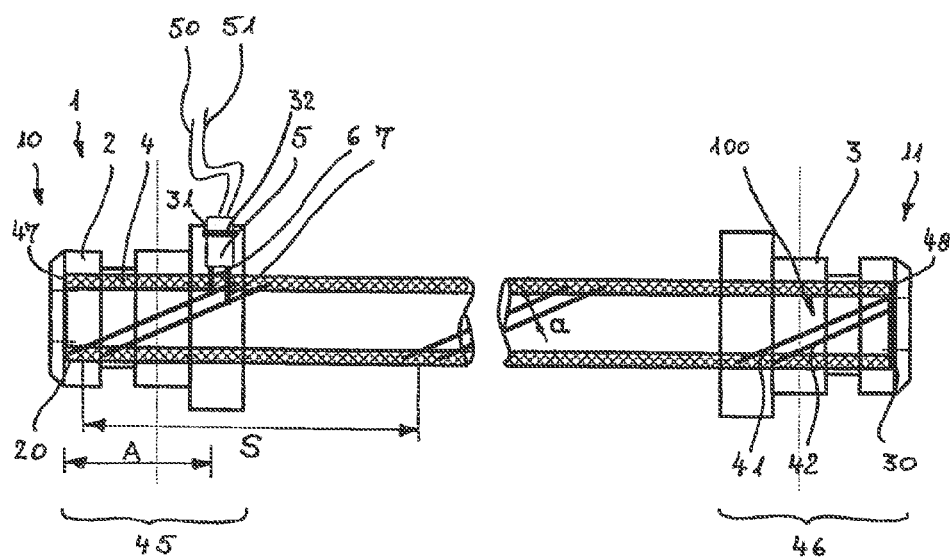
FIG. 1 is a side sectional view as a schematic diagram of a first embodiment of a prefabricated electrically heatable media line according to the invention.

FIG. 1 shows a side sectional view of a prefabricated electrically heatable media line 1. The latter is provided at both of its ends 10, 11 with a respective connection device 2, 3. The media line 1 further encompasses a tubing part 4. The tubing part 4 is designed as an electrically heatable multilayer plastic pipe. The tubing part 4 has embedded in its wall an electrically conductive device 100. The latter has two heating conductors 41, 42 (denoted on FIG. 1) or conductors 141, 142 (denoted on FIG. 2) guided roughly parallel to each other and extending helically at a steep gradient along the tubing part. FIG. 3 only lists the reference numbers 41, 42 for the heating conductors. However, it must here be understood that the conductors 141, 142 can alternatively also be provided. The electrically conductive device 100 is used to heat the tubing part 4. If the heating conductors 41, 42 are provided, heating takes place with the latter, while if electrical conductors 141, 142 embedded in conductive plastic are provided, the plastic comprises the heating source, since electrical current flows through the latter between the electrical conductors serving as the poles. The conductors 141, 142 can also be labeled as contacting conductors, wherein they function like a parallel arrangement of resistors over the entire length of the tubing part 4.

Figure 2:
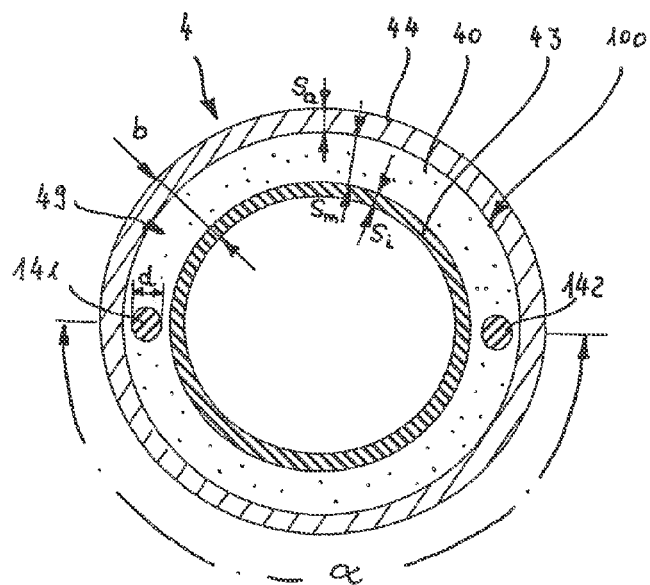
FIG. 2 is a cross sectional view through a tubing part of a media line according to the invention, wherein the conductors or heating conductors are arranged at an angle of 180° relative to each other.
Figure 3:
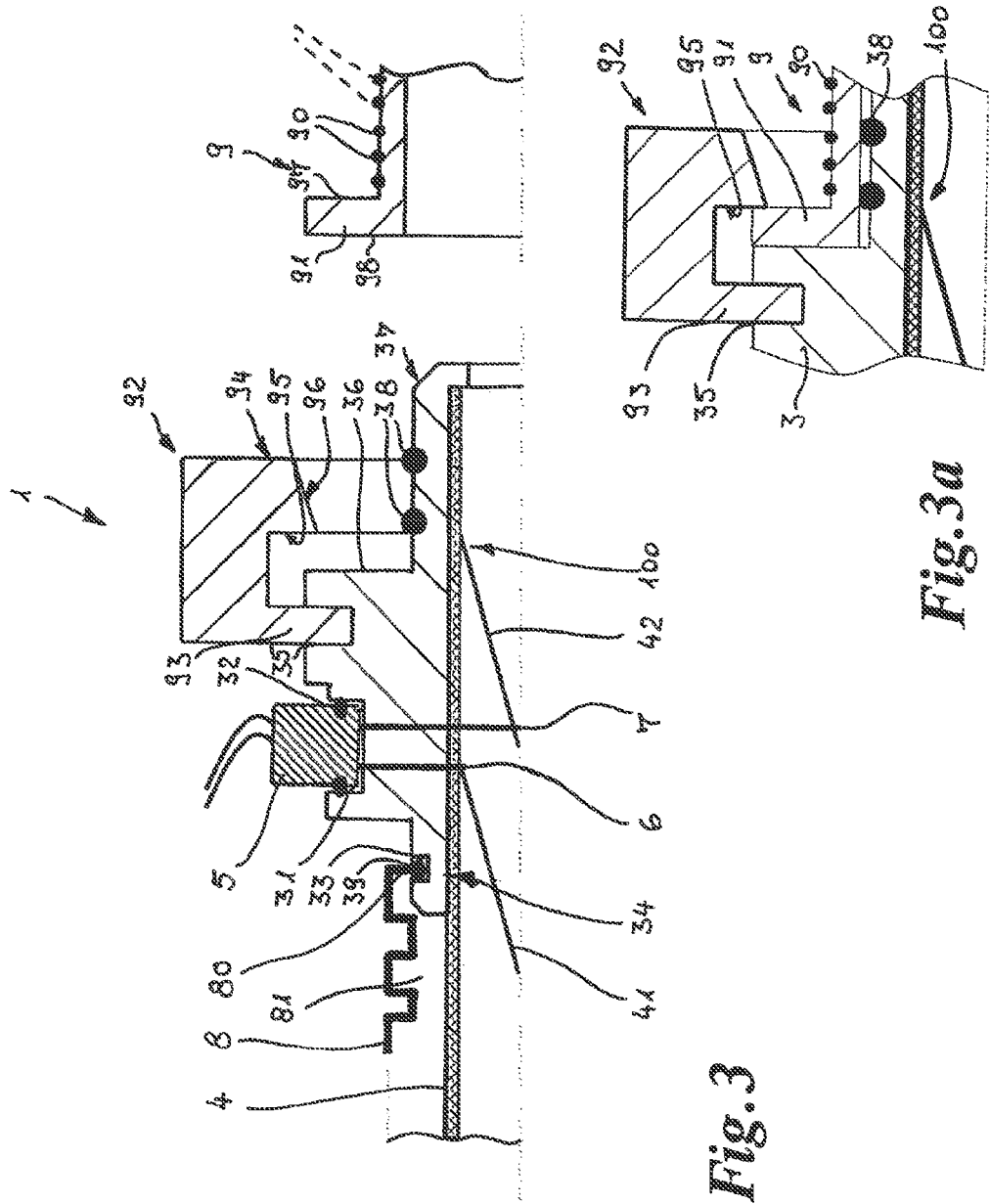
FIG. 3 is a schematic detailed view of another embodiment of a prefabricated electrically heatable media line according to the invention in the area of an end-side connection device of the media line.

As denoted on FIG. 2, additional conductive components 49 can be located in a middle layer 40 so as to provide electrical conductivity. The plastic material of the tubing part 4 can hence be filled with the conductive components in this middle layer 40, e.g., with conductive carbon black, metal powder, carbon nanotubes, etc., and exhibits the electrically conductive conductors 141, 142. The two conductors 141, 142 combined with the conductive components of the middle layer 40 in the embodiment according to FIG. 2 or the heating conductors 41, 42 according to FIG. 1 result in a homogeneous distribution of heat output over the entire periphery of the tubing part 4.

Adjacent to the middle layer 40, the tubing part exhibits an inner layer 43, which can be referred to as a header, since it is designed like a pipe jacket. It has electrically insulating properties to insulate the medium flowing inside the header against the currents of the middle layer flowing in the conductors or heating conductors and the conductive components. In order to be resistant to the medium flowing inside the header, such as AdBlue®, a highly pure reducing agent for SCR catalyst systems (SCR=selective catalytic reduction), the inner layer 43 exhibits a corresponding media resistance. For example, it can consist of polyvinylidene fluoride or an aliphatic polyamide, in particular PA12. The layer thickness can measure 0.1 to 0.3 mm, wherein other layer thicknesses are basically also possible.

The tubing part 4 further exhibits an outer layer 44. The latter is neither thermally nor electrically conductive, and can consist of a thermally insulating material, e.g., PA12, meaning an aliphatic polyamide. The three-layer structure is shown by example on FIG. 2, which depicts a cross sectional view through a tubing part 4 with conductors 141, 142 arranged at an angle of $\alpha=180°$ relative to each other. The structure of the tubing part 4 essentially corresponds to that of the tubing parts 4 on FIGS. 1 and 3. The only difference by comparison to the latter is the arrangement of the two conductors 141, 142 or heating conductors 41, 42 relative to each other, which are inclined at an angle smaller than $\alpha=180°$ relative to each other on FIGS. 1 and 3, e.g., $\alpha=10°$ to $15°$.

As may further be gleaned from FIG. 1, the tubing part 4 extends from the outer or distal end 20 of the connection device 2 to likewise the outer or distal end 30 of the connection device 3. As a consequence, the tubing part 4 extends completely along the media line 1, so that no other conductors or heating conductors are required in the area of the connection devices 2, 3 to heat it.

A connector plug 5 with connection lines 50, 51 is used to electrically connect the two conductors 141, 142 or heating conductors 41, 42 to an electrical energy source. Use can also be made of an electrical connector into which a connector plug with connection lines can be inserted. Use can further be made of connection lines routed out onto the outside of the connection device, or potentially even as far as to an energy source. The connector plug is fitted onto two connecting elements 6, 7, which are coupled with the two conductors 141, 142 or heating conductors 41, 42. Material on a surface of the tubing part 4 covering the conductors 141, 142 or heating conductors 41, 42 is exposed for this purpose. For example, this takes place through laser cutting. During the latter, the laser beam can burn the material, wherein it hits the tubing part 4 perpendicularly or essentially perpendicularly to its outer surface. The laser cut can further be introduced by having the laser beam blast away material, wherein it tangentially hits the outer surface of the tubing part. The conductors 141, 142 or heating conductors 41, 42 can be connected by soldering or welding, in particular by inductive soldering or pulse welding. After the two connecting elements 6, 7 have been connected with the conductors 141, 142 or heating conductors 41, 42, the connecting elements protrude from the tubing part 4. The connector plug 5 is then fitted onto the ends of the two connecting elements 6, 7 projecting from the surface of the tubing part 4. In the embodiment shown on FIG. 1, a sealing ring 32 is used for sealing the connector plug. Providing such a sealing element makes it possible to outwardly seal a recess 31 accommodating the connector plug or the connecting elements 6, 7, providing a safeguard against the penetration by moisture in particular. This is shown on FIGS. 1 and 3. When leading through the connection lines, the latter can be outwardly sealed by individual strand packings, in particular by providing very small sealing rings for each connection line.

The two end-side connection devices 2, 3 are arranged in the two end regions 45, 46 of the tubing part 4. They are there formed as connection contours by sheathing the end regions 45, 46 of the tubing part 4. In this case, the two conductors 141, 142 or heating conductors 41, 42 are first exposed, the two conductors 141, 142 or heating conductors are then connected with the two connecting elements 6, 7, and the two end regions 45, 46 of the tubing part 4 are subsequently sheathed to apply the respective connection contour 2, 3. The connector plug 5 is then fitted onto the two connecting elements 6, 7 or their protruding ends, so as to enable a connection to an electrical energy supply. For example, the connection contours can be configured as plugs, screw or coupling contours.

According to the exemplary embodiment on FIG. 1, the two conductors 141, 142 or heating conductors 41, 42 are connected only in the area of the one connection device 2. However, provided so desired given more than two conductors or heating conductors, for example, it would basically also be possible to connect the conductors or heating conductors in the other connection device 3. Instead of the depicted straight shape of the connection devices 2, 3, the latter can also be designed as Y or T lines, optimized in terms of current in the radius of the tubing part 4, or as right-angle plugs, for example.

Figure 4:
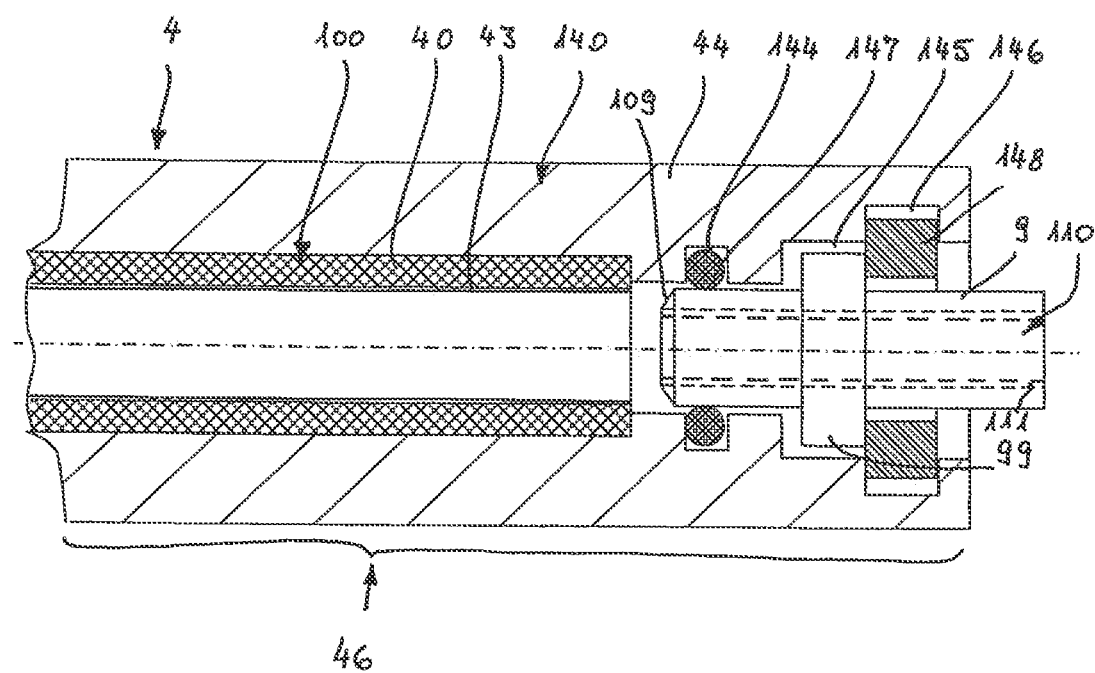
FIG. 4 is a schematic side sectional view illustrating the details of another embodiment of a connection device for a media line according to the invention.

As shown on FIG. 4, a connecting socket 140 can also be provided instead a separately attached connection device. The former is formed by expanding the end region 45 or 46. In the example depicted on FIG. 4, the outer layer 44 is provided with a larger wall thickness at least in the end region 46. The inside of the outer layer 44 is provided with recesses 144, 145, 146 for inserting a gasket ring 147, as well as a connection contour 9 on a generating set or generating set plug and a restraint 148 for locking the latter in the connecting socket 140. In order to lock the connection contour or connector plug in the connecting socket 140, the connection contour or connector plug exhibits an overhanging partial region 99, which is gripped from behind by the restraint 148. For example, the restraint can be designed as a resilient ring and, similarly to the axial clip 92 shown on FIG. 3, exhibit an inclined or beveled surface to make the connector plug or connection contour easier to introduce.

The frontal or proximal end 109 of the connection contour approaches very close to the electrically conductive device 100, and can potentially even be arranged concentrically relative to the latter by engaging into the corresponding end-side section of the layer of the tubing part 4 containing it. As opposed to the embodiments on FIGS. 1 and 3, the individual layers of the tubing part depicted in the embodiment on FIG. 4 do not end in a plane, with the outer layer 44 instead extending beyond the inner 43 and middle layer 40.

Aside from the connection socket, a thermal sheath 111 can be provided for the connection contour 9. It is incorporated in the fluid channel 110 of the connection contour 9, and thus directly contacts the medium or fluid flowing through the media line 1 and connection contour 9. In order to here avoid corrosion, in particular when AdBlue® is flowing through, the thermal sheath 111 advantageously consists of stainless steel or aluminum. The thermal sheath 111 is tempered by the medium or fluid in the area of the (unheated) connection socket 140. This improves how well heat can be conveyed between the heated areas of the tubing part 4 with connection socket 140 and the connection contour 9 with tubing part. When these areas are electrically heated, the thermal sheath 111 plays at least a supporting role in light of its thermal conductivity.

As evident from the detailed view of the media line 1 in an alternative embodiment on FIG. 3, the connection contour can also exhibit yet another shape. The shape can be tailored to the respective application, wherein conventional SAE plug configurations can also be selected.

The connection device or contour according to FIG. 3 exhibits a recess 31 for inserting the connector plug 5. The latter is sealed inside the molded-in recess 31 by means of a sealing element, here a sealing ring 32, such as an O-ring. Clearly evident on FIG. 3 as well are the two connecting elements 6, 7, which are connected with the two conductors 141, 142 or heating conductors 41, 42 on the one hand, and project through the connection contour and into the recess 31 on the other.

The connection contour is further provided with a receiving groove 33 in the end-side region 34, which is aligned in the direction of a protective or insulating pipe, as illustrated by a corrugated pipe 8. The receiving groove 33 is used to insert the inwardly projecting end side of a collar 80 of the corrugated pipe 8. The corrugated pipe 8 or insulating gap 81 between the corrugated pipe 8 and tubing part 4 serves to insulate the segment of the tubing part 4 arranged between the two connection devices 2, 3. Providing the receiving groove 33 allows the continuous collar 80 of the corrugated pipe 8 to engage and latch there, so that an intentional detachment of the corrugated pipe can be prevented in the process. The receiving groove 33 accommodates a gasket 39 to prevent moisture from penetrating into the gap between the corrugated pipe 8 and tubing part 4, i.e., the insulating gap 81. For example, an O-ring or a two-component seal can there be provided. The two-component seal can be concurrently directly gated to the connection contour. The same basically also holds true for the sealing ring 32, which seals the connector plug 5 inside the recess 31. The latter can also be gated right in the process of manufacturing the connection device.

As further evident from FIG. 3, in order to join the connection device 3 with a connection contour 9 to a generating set, the contour of the connection device 3 is correspondingly tapered in the end region or provided with a smaller diameter than in the area having the recess 31 for accommodating the connector plug 5, for example. In the embodiment shown on FIG. 3, the connection contour 9 exhibits a connection heater on the generator set side, which is illustrated by the denoted heating conductors 90. The connection contour 9 further exhibits an overhanging front flange 19. The latter is used to fasten and lock the connection contour 9 to the connection device 3. The connection contour 9 is secured in the area of the flange 91 by means of an axial clip 92. The latter exhibits a continuous, inwardly directed collar 93, which engages into a corresponding receiving groove 35 of the connection device 3. While extruding the connection device 3, the receiving groove 35 is concurrently molded in directly, and serves to axially retain the axial clip 92 on the connection device 3.

A retaining contour 94 of the axial clip 92 is used to grip the flange 91 from the back. The former exhibits a retaining surface 95 on the one hand, which is situated roughly parallel to the lateral walls of the collar 93. On the other hand, the retaining contour 94 has an inclined, conically tapered or beveled surface 96. The conical section of the axial clip 92 exhibits a larger opening in the outward direction, and a smaller opening in the inward direction, i.e., in the direction of the retaining surface 95. As the flange 91 is being inserted into the axial clip 92, the latter can initially be outwardly diverted while acting on the beveled surface 96, after which its retaining surface 95 can tightly abut against the lateral surface 97 of the flange 91, so that the latter abuts against a retaining surface 36 of the plug or coupling contour with its other lateral surface 98, and is accommodated and latched between the retaining surface 36 and retaining surface 95. FIG. 3a shows the axial clip and connection contour 9 in a joined state.

In order to seal the connection contour 9, two gaskets in the form of sealing rings 38, e.g., O-rings, are mated onto the connection part 37 of the connection device 3. It is basically also possible to already concurrently mold in gaskets during the extrusion process for manufacturing the connection device 3.

The tubing part 4 can be designed as an electrically heatable multilayer plastic pipe as a so-called MLT pipe (multilayer technique). As already mentioned above, polyamides can be used for all three layers 40, 43, 44, in particular PA12 or PA11. For example, the inner layer 43 visible in particular on FIG. 2 has a layer thickness $s_i$ of 0.1 to 0.3 mm, while the outer layer 44 also evident on FIG. 2 has an exemplary layer thickness $s_a$ of 0.4 mm. The outer layer 44 can be laser machined so as to be able to expose the conductors 141, 142 or heating conductors 41, 42 or also attach components of the connection device in a laser welding process. The middle layer 40 can exhibit a layer thickness $s_m$ of 0.3 to 1.0 mm.

In order to avoid damage to the inner layer 43 in particular, a barrier layer not shown on FIG. 2 can be provided between the middle layer 40 and inner layer 43. It is also possible to provide a barrier layer between the outer layer 44 and middle layer 40, so as to also protect the latter in the environment of the conductors 141, 142 or heating conductors 41, 42 against damage during their exposure. In the area of the two conductors or heating conductors, it should basically be possible to remove any barrier layer provided, so that the conductors or heating conductors 41, 42 can be connected with the connecting elements 6, 7. If the barrier layer is provided between the outer and middle layer, the outer layer can be removed up to the barrier layer via laser cutting, after which the barrier layer can be mechanically removed, so that the conductors or heating conductors can be contacted.

For example, the conductors or heating conductors themselves can have a diameter of d=0.4 mm. As evident from FIG. 2, two conductors or heating conductors can be provided. However, it is also possible to provide more conductors or heating conductors, for example four. The two conductors or heating conductors depicted on FIG. 2 exhibit an angle relative to each other of α=180°. However, they can also exhibit any other angle relative to each other between 10° and 360°. Distance a between the two conductors or heating conductors 41, 42 or the windings of the two conductors or heating conductors can measure 20 to 60 mm, in particular 40 mm. Gradient S of the two conductors or heating conductors is comparatively large, and can measure 20 to 150 mm, in particular 40 to 80 mm. The overall wall thickness b of the tubing part 4 measures in particular 4 mm or less, e.g., 2 mm or less, e.g., 1.5 mm or less, e.g., 1.0 mm or less.

The locations to be cut with lasers may be derived from knowing the position of the two conductors or heating conductors as well as in particular their gradient S on at least one of the front surfaces 47, 48 of the two ends of the tubing part 4, so that the correct position for the laser, and hence laser cutting, can readily be found regardless of the actual positioning of the tubing part 4 in a laser cutting device or device for manufacturing the media line 1. The position of the conductors or heating conductors is here determined based on the position of the conductors 141, 142 or heating conductors 41, 42 in the front surface 47 or 48 with knowledge of the gradient S as well as the distance A of the connecting site from the front surface. This advantageously makes it possible to automate media line production, i.e., to avoid manual operations, since the process for determining the position for the connecting site and laser cut can be controlled by computer.

While manufacturing the media line 1, the tubing part 4 coming from the extrusion system is inserted into a laser cutting device, the two conductors 141, 142 or heating conductors 41, 42 embedded in the wall of the tubing part are exposed through laser cutting, and electrically connected with the connecting elements 6, 7. A respective plug or coupling contour for generating the two connection devices 2, 3 is then sprayed on or applied in some other way through primary shaping or material bonding in a plastic injection molding device at both ends of the tubing part 4 in the end regions 45, 46. In order to enable a tight assembly of connector plug 5, corrugated pipe 8 and connection contour 9, O-rings or other sealing elements can subsequently also be fitted on the connection device 2, 3 at the corresponding sites provided for this purpose. Such sealing elements can also be molded in during the plastic injection molding process or while manufacturing the connection device 2, 3.

In addition to the embodiments of prefabricated electrically heatable media lines described above and shown on the figures, numerous others are also possible, in which the respective tubing part and electrically conductive device extend as far as or at least close to the end of the connection device that is averted to the tubing part, or close to, in front of or in a connection contour, or, in at least one end region of the tubing part, the integrated electrically conductive device is exposed, durably electrically contacted by a contacting device, and the contacting device is routed out on the outside of the tubing part for connection to an electrical energy source. In particular, the end regions of the tubing part can be provided with connection contours after the electrically conductive device embedded in its wall has been exposed.

REFERENCE LIST

1 Prefabricated electrically heatable media line
2 Connection device
3 Connection device
4 Tubing part
5 Connector plug
6 Connecting element
7 Connecting element
8 Corrugated pipe
9 Connection contour
10 First end of the media line
11 Second end of the media line
20 Outer/distal end
30 Outer/distal end
31 Recess
32 Sealing ring
33 Receiving groove
34 End-side region
35 Receiving groove
36 Retaining surface
37 Connection part
38 O-ring seal
39 Gasket
40 Middle layer
41 Heating conductor
42 Heating conductor
43 Inner layer
44 Outer layer
45 End region
46 End region
47 First front surface
48 Second front surface
49 Conductive component
50 Line
51 Line
80 Continuous collar
81 Insulating gap
90 Heating conductor
91 Flange
92 Axial clip
93 Collar
94 Retaining contour
95 Retaining surface
96 Beveled surface
97 Lateral surface
98 Lateral surface
99 Overhanging partial region
100 Electrically conductive device
109 Front end of 9
110 Fluid channel
111 Thermal sheath
140 Connecting socket
141 Electrical conductor
142 Electrical conductor
144 Recess
145 Recess
146 Recess
147 Sealing ring
148 Retaining device
a Distance between windings of conductor or heating conductor
α Angle of conductors or heating conductors relative to each other
A Distance to the connecting site
b Wall thickness of the tubing part
d Diameter of conductor or heating conductor
S Gradient
$s_a$ Layer thickness of outer layer
$s_i$ Layer thickness of inner layer
$s_m$ Layer thickness of middle layer

What is claimed is:

1. A prefabricated electrically heatable media line, comprising: at least one tubing part having an electrically heatable multi-layer pipe wall having an integrated electrically conductive device provided as a middle layer comprising an electrical conductor located between an inner layer and an outer layer of the tubing part and with at least one connection device at an end region of the tubing part for establishing a fluidic connection of the media line, wherein the connection device is attached on or to the end region of the tubing part by primary shaping and/or material bonding, wherein the middle layer of the tubing part includes a plastic material filled with at least one conductive component, wherein the middle layer has at least two electrical conductors, wherein the electrical conductors are coiled around the inner layer of the tubing part at a gradient (S) of 20 to 150 mm, so as to enable or facilitate the forming and bending of the tubing part, wherein the at least one conductive component is one or more of conductive carbon black, metal powder, and carbon nanotubes, wherein the connection device is heatable by the electrically conductive device without having any additional conductor or heater provided on or in the connection device, and wherein at least one connecting element extends from the electrically conductive device to the outside of the connection device.

2. The prefabricated electrically heatable media line according to claim 1, wherein in order to generate an insulation effect for the tubing part, an insulating air gap is provided between an insulating or protective pipe or sheath at least partially enveloping the latter and the tubing part, or the tubing part exhibits an insulating layer.

3. The prefabricated electrically heatable media line according to claim 1, wherein the connection device encompasses at least one receiving groove for accommodating one end of a protective or insulating pipe enveloping the tubing part or a sheath.

4. The prefabricated electrically heatable media line according to claim 1, wherein at least one sealing device is molded in or on the connection device.

5. The prefabricated electrically heatable media line according to claim 1, wherein the tubing part has a wall thickness (b) of 4 mm or less, and/or the angle (a) between two electrical conductors measures 10 to 360°, and/or a diameter (d) of the electrical conductors measures less than 0.5 mm, and/or a distance (a) between the windings of the electrical conductors measures 20 to 60 mm.

6. A method for manufacturing a media line according to claim 1, comprising the steps of:
fabricating the tubing part with the multi-layer pipe wall with the integrated electrically conductive device located between the inner layer and the outer layer of the tubing part, the at least one integrated electrically conductive device provided as the electrical conductor, and provided with the at least one connection device at the end region of the tubing part, and,
exposing in at least one end region of the tubing part, the integrated electrically conductive device, durably making electrical contact with the latter by the connecting element, and routing the connecting element out on the outside of the tubing part for connection to an electrical energy source.

7. The method according to claim 6, wherein in order to generate the connection device for establishing a fluidic connection at the end region of the tubing part, a connection contour is generated by primary shaping or a connection contour is attached.

8. The method according to claim 6, wherein the integrated electrically conductive device is exposed through laser cutting.

9. The method according to claim 6, wherein the integrated electrically conductive device is contacted with the at least one connecting element via inductive soldering or pulse welding.

10. The prefabricated electrically heatable media line according to claim 1, wherein the at least one connection device is a plug, screw, or coupling device, and wherein the connection device is attached on or to an end region of the tubing part by sheathing, gating, casting, laser welding, friction welding or adhesive bonding.

11. The prefabricated electrically heatable media line according to claim 1, wherein the tubing part exhibits 2 to 4 inwardly extruded electrical conductors, or heating conductors that are wires, strands, and/or non-insulated conductors.

12. The prefabricated electrically heatable media line according to claim 2, wherein the tubing part has an outer layer that has an insulation effect.

13. The prefabricated electrically heatable media line according to claim 5, wherein the tubing part wall thickness (b) is 1 mm or less, and/or the angle (a) between two electrical conductors is 180°, and or the diameter (d) of the electrical conductors measures 0.4 mm and/or the distance (a) between the windings of the electrical conductors is 40 mm.

14. The method according to claim 8, wherein the integrated electrically conductive device is at least one electrical conductor.

* * * * *